(12) United States Patent
Kamada et al.

(10) Patent No.: US 10,843,933 B2
(45) Date of Patent: Nov. 24, 2020

(54) FRICTION MATERIAL COMPOSITION, FRICTION MATERIAL, AND FRICTION MEMBER

(71) Applicant: OTSUKA CHEMICAL CO., LTD., Osaka (JP)

(72) Inventors: Shogo Kamada, Tokushima (JP); Kazuhiro Tada, Tokushima (JP); Emiko Daimon, Tokushima (JP); Toshiaki Yagi, Tokushima (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/481,592

(22) PCT Filed: Mar. 5, 2018

(86) PCT No.: PCT/JP2018/008222
§ 371 (c)(1),
(2) Date: Jul. 29, 2019

(87) PCT Pub. No.: WO2018/164028
PCT Pub. Date: Sep. 13, 2018

(65) Prior Publication Data
US 2020/0002184 A1 Jan. 2, 2020

(30) Foreign Application Priority Data

Mar. 8, 2017 (JP) ................. 2017-043800

(51) Int. Cl.
| | | |
|---|---|---|
| C01G 23/00 | (2006.01) | |
| C01F 11/46 | (2006.01) | |
| C08L 63/04 | (2006.01) | |
| F16D 69/02 | (2006.01) | |

(52) U.S. Cl.
CPC .......... C01G 23/005 (2013.01); C01F 11/462 (2013.01); C08L 63/04 (2013.01); F16D 69/02 (2013.01); *C01P 2004/60* (2013.01); *C01P 2006/12* (2013.01); *C01P 2006/90* (2013.01)

(58) Field of Classification Search
CPC ...... C01G 23/005; C08L 63/04; C01F 11/462; F16D 69/02; C01P 2006/90; C01P 2004/60; C01P 2006/12
See application file for complete search history.

(56) References Cited

U.S. PATENT DOCUMENTS

| | | | |
|---|---|---|---|
| 2004/0253173 A1 | 12/2004 | Ogawa et al. | |
| 2007/0219289 A1* | 9/2007 | Phipps ................. | F16D 69/026 523/152 |
| 2009/0264571 A1 | 10/2009 | Yamamoto | |
| 2009/0318594 A1 | 12/2009 | Grothe et al. | |
| 2009/0326114 A1 | 12/2009 | Grothe et al. | |
| 2010/0093908 A1 | 4/2010 | Aki et al. | |
| 2011/0171424 A1 | 7/2011 | Kliesch et al. | |
| 2012/0101185 A1* | 4/2012 | Valentine .............. | A61L 27/446 523/113 |
| 2012/0245262 A1* | 9/2012 | Hao ........................ | C08K 5/42 524/161 |
| 2014/0342899 A1 | 11/2014 | Itami et al. | |
| 2015/0287753 A1 | 10/2015 | Sugai et al. | |
| 2015/0369320 A1 | 12/2015 | Onda et al. | |
| 2016/0046772 A1 | 2/2016 | Daimon et al. | |
| 2016/0108982 A1 | 4/2016 | Nomoto et al. | |
| 2016/0221882 A1 | 8/2016 | Muroya et al. | |
| 2017/0291855 A1 | 10/2017 | Kamada | |
| 2018/0031067 A1 | 2/2018 | Unno et al. | |
| 2019/0063535 A1 | 2/2019 | Mitsumoto | |

FOREIGN PATENT DOCUMENTS

| | | |
|---|---|---|
| CN | 1575259 A | 2/2005 |
| CN | 101490157 A | 7/2009 |
| CN | 101583658 A | 11/2009 |
| CN | 101616869 A | 12/2009 |
| CN | 101743268 A | 6/2010 |
| CN | 103443178 A | 12/2013 |
| CN | 104854213 A | 8/2015 |
| CN | 104884562 A | 9/2015 |
| CN | 105152203 A | 12/2015 |
| CN | 105189644 A | 12/2015 |
| CN | 105264038 A | 1/2016 |
| JP | 10-195420 A | 7/1998 |
| JP | 11-61105 A | 3/1999 |
| JP | 2013-76058 A | 4/2013 |
| JP | 2015-59143 A | 3/2015 |
| JP | 2015-147913 A | 8/2015 |
| JP | 2016-145274 A | 8/2016 |
| JP | 2016-153440 A | 8/2016 |
| JP | 2016-222817 A | 12/2016 |
| JP | 2017-2186 A | 1/2017 |
| WO | 03/037797 A1 | 5/2003 |

(Continued)

OTHER PUBLICATIONS

Office Action dated Feb. 17, 2020, issued in counterpart IN Application No. 20197028458, with English translation (5 pages).

(Continued)

*Primary Examiner* — Vishal V Vasisth
(74) *Attorney, Agent, or Firm* — Westerman, Hattori, Daniels & Adrian, LLP

(57) ABSTRACT

Provided is a friction material composition that can increase the coefficient of friction and the wear resistance, reduce the compressive deformation rate, and improve the yield upon hot forming, even when being free of copper component or having a small content of copper component. The friction material composition contains: titanate compound powder made of non-fibrous titanate compound particles; barium sulfate powder; and a thermosetting resin, wherein the titanate compound powder has an alkali metal ion dissolution rate of 15.0% by mass or less, the barium sulfate powder has a volume-based 50% cumulative particle diameter ($D_{50}$) of 0.1 μm to 20.0 μm, and a content of copper component is 0.5% by mass or less in terms of copper element in a total amount of 100% by mass of the friction material composition.

8 Claims, No Drawings

(56) References Cited

FOREIGN PATENT DOCUMENTS

| WO | 2012/066968 A1 | 5/2012 |
| WO | 2014/098215 A1 | 6/2014 |
| WO | 2016063688 A1 | 4/2016 |

OTHER PUBLICATIONS

Notification of Transmittal of Copies of Translation of the International Preliminary Report on Patentabililty (Form PCT/IB/338) issued in counterpart International Application No. PCT/JP2018/008222 dated Sep. 19, 2019 with Forms PCT/IB/373 and PCT/ISA/237 (7 pages).
International Search Report dated Apr. 10, 2018, issued in counterpart International Application No. PCT/JP2018/008222 (2 pages).
Office Action dated Aug. 12, 2020, issued in counterpart CN application No. 201880010611.0, with English translation. (16 pages).

* cited by examiner

FRICTION MATERIAL COMPOSITION, FRICTION MATERIAL, AND FRICTION MEMBER

This application is a 371 of PCT/JP2018/008222, filed Mar. 5, 2018.

TECHNICAL FIELD

The present invention relates to friction material compositions containing titanate compound powder, friction materials using the friction material compositions, and friction members using the friction material compositions.

BACKGROUND ART

Friction members for various types of vehicles, industrial machines, and so on, such as a brake lining and a disc pad each constituting a part of a braking device, and a clutch facing, are required to have a high and stable coefficient of friction, excellent fade resistance, excellent wear resistance, and low aggressiveness toward a rotor (a counter-member).

To meet these properties, a friction member has heretofore been used which includes a friction material formed of a resin composition containing fibrous potassium titanate particles, an inorganic filler, an organic filler, and a thermosetting resin (binder), such as phenolic resin, for binding the above other materials. Fibrous potassium titanate particles do not damage a rotor (a counter-member) and have excellent frictional properties. However, many types of fibrous potassium titanate particles have an average fiber diameter of 0.1 µm to 0.5 µm and an average fiber length of 10 µm to 20 µm and therefore include WHO fibers (fibrous particles having a length of 5 µm or more, a breadth of 3 µm or less, and an aspect ratio of 3 or more) defined by the World Health Organization (WHO). For this reason, there have been proposed and used, as an alternative, titanate compound particles that are non-fibrous (for example, platy or of a shape with multiple projections), which can achieve properties required as a friction material while avoiding safety and health concerns. Furthermore, if powder made of titanate compound particles has a large content of sulfate ions, the friction material easily gets rusted. Therefore, titanate compound powder having a small content of sulfate ions has been demanded and used (Patent Literature 1).

The resin composition for use as a friction material further contains copper fibers or copper powder for the purpose of increasing the wear resistance. It is believed that the reason is that, during friction between the friction material and a rotor (a counter-member), the ductility of copper causes formation of an adhesive film on the surface of the rotor and this adhesive film acts as a protective film to enable the resin composition to keep a high coefficient of friction at high temperatures. However, in relation to friction materials containing copper, abrasion powder produced during braking contains copper and it is suggested that copper contained in the abrasion powder can be a cause of pollution of rivers, lakes, and the sea. Therefore, the copper usage is restricted in North America. As solutions to this, in order to avoid incorporation of a copper component or reduce the content of copper, there have been proposed: a friction material composition containing lithium potassium titanate and graphite (Patent Literature 2); a friction material composition containing two or more types of titanate compounds and ceramic fibers (Patent Literature 3); a friction material composition containing a titanate compound having a tunnel crystal structure and a titanate compound having a layered crystal structure (Patent Literature 4); and a friction material composition containing a titanate compound formed of particles with multiple projections and biosoluble inorganic fibers (Patent Literature 5).

CITATION LIST

Patent Literature

Patent Literature 1: JP-A-2016-145274
Patent Literature 2: WO 2012/066968
Patent Literature 3: JP-A-2015-59143
Patent Literature 4: JP-A-2015-147913
Patent Literature 5: JP-A-2013-76058

SUMMARY OF INVENTION

Technical Problem

When a friction material composition is free of copper component or has a small content of copper component, like those disclosed in Patent Literatures 2 to 5, there arises a problem that its compressive deformation rate is large and its yield upon hot forming is poor.

An object of the present invention is to provide: a friction material composition that can increase the coefficient of friction and the wear resistance, reduce the compressive deformation rate, and improve the yield upon hot forming, even when being free of copper component or having a small content of copper component; and a friction member using the friction material composition.

Solution to Problem

The inventors conducted intensive studies, thus found that the above problem can be solved by using a friction material composition in which, under the condition that it is free of copper component or has a small content of copper component, titanate compound powder has a certain alkali metal ion dissolution rate or less and titanate compound particles with a particular shape and barium sulfate particles (powder) with a particular particle diameter are contained, and completed the present invention.

Specifically, the present invention provides the following friction material composition, friction material, and friction member.

Aspect 1: A friction material composition containing: titanate compound powder made of non-fibrous titanate compound particles; barium sulfate powder; and a thermosetting resin, wherein the titanate compound powder has an alkali metal ion dissolution rate of 15.0% by mass or less, the barium sulfate powder has a volume-based 50% cumulative particle diameter ($D_{50}$) of 0.1 µm to 20.0 µm, and a content of copper component is 0.5% by mass or less in terms of copper element in a total amount of 100% by mass of the friction material composition.

Aspect 2: The friction material composition according to aspect 1, wherein the barium sulfate powder has a volume-based 90% cumulative particle diameter ($D_{90}$) of 0.1 µm to 20.0 µm.

Aspect 3: The friction material composition according to aspect 1 or 2, wherein the titanate compound powder has a volume-based 50% cumulative particle diameter ($D_{50}$) of 1.0 µm to 150.0 µm.

Aspect 4: The friction material composition according to any one of aspects 1 to 3, wherein the titanate compound powder is powder of at least one compound selected from the group consisting of: $A_2Ti_nO_{(2n+1)}$ [where A represents at least one of alkali metals except for Li and n is a value from 4 to 11]; $A_{(2+y)}Ti_{(6-x)}M_xO_{(13+y/2-(4-z)x/2)}$ [where A represents at least one of alkali metals except for Li, M represents at least one selected from among Li, Mg, Zn, Ga, Ni, Cu, Fe, Al, and Mn, z represents a valence of the element M and is an integer from 1 to 3, $0.05 \le x \le 0.5$, and $0 \le y \le (4-z)x$]; $A_xM_yTi_{(2-y)}O_4$ [where A represents at least one of alkali metals except for Li, M represents at least one selected from among Li, Mg, Zn, Ga, Ni, Cu, Fe, Al, and Mn, x is a value from 0.5 to 1.0, and y is a value from 0.25 to 1.0]; $A_{0.5-0.7}Li_{0.27}Ti_{1.73}O_{3.85-3.95}$ [where A represents at least one of alkali metals except for Li]; $A_{0.2-0.7}Mg_{0.40}Ti_{1.6}O_{3.7-3.95}$ [where A represents at least one of alkali metals except for Li]; and $A_{0.5-0.7}Li_{(0.27-x)}M_yTi_{(1.73-z)}O_{3.85-3.95}$ [where A represents at least one of alkali metals except for Li, M represents at least one selected from among Mg, Zn, Ga, Ni, Cu, Fe, Al, and Mn (as for M composed of two or more types of metals, excepting any combination of ions having different valences), as for M being a divalent metal, $x=2y/3$ and $z=y/3$, as for M being a trivalent metal, $x=y/3$ and $z=2y/3$, and $0.004 \le y \le 0.4$].

Aspect 5: The friction material composition according to any one of aspects 1 to 4, wherein the titanate compound powder has a sulfate ion dissolution rate of 0.2% by mass or less.

Aspect 6: The friction material composition according to any one of aspects 1 to 5, wherein a content of the barium sulfate powder is 1% by mass to 50% by mass relative to a total amount of 100% by mass of the friction material composition.

Aspect 7: The friction material composition according to any one of aspects 1 to 6, wherein a content of the titanate compound powder is 1% by mass to 40% by mass relative to a total amount of 100% by mass of the friction material composition.

Aspect 8: A friction material being a formed body of the friction material composition according to any one of aspects 1 to 7.

Aspect 9: A friction member including the friction material according to aspect 8.

Advantageous Effects of Invention

The friction material composition according to the present invention can increase the coefficient of friction and the wear resistance, reduce the compressive deformation rate, and improve the yield upon hot forming, even when being free of copper component or having a small content of copper component.

The friction material and the friction member according to the present invention not only have a high coefficient of friction and excellent wear resistance, but also have a small compressive deformation rate and good yield upon hot forming, even when being free of copper component or having a small content of copper component.

DESCRIPTION OF EMBODIMENTS

Hereinafter, a description will be given of an example of a preferred embodiment for working of the present invention. However, the following embodiment is simply illustrative. The present invention is not at all limited by the following embodiment.

<Friction Material Composition>

A friction material composition according to the present invention is a friction material composition containing: titanate compound powder made of non-fibrous titanate compound particles; barium sulfate powder; and a thermosetting resin, wherein the titanate compound powder has an alkali metal ion dissolution rate of 15.0% by mass or less, the barium sulfate powder has a volume-based 50% cumulative particle diameter ($D_{50}$) of 0.1 μm to 20.0 μm, and a content of copper component is 0.5% by mass or less in terms of copper element in a total amount of 100% by mass of the friction material composition, and the friction material composition can further contain other materials as necessary.

The friction material composition has a content of 0.5% by mass or less of copper component in terms of copper element in a total amount of 100% by mass of the friction material composition or is preferably free of copper component. Thus, the friction material can be environmentally friendly as compared to conventional friction materials. Note that the term "free of copper component" in the present invention means that the friction material composition contains none of copper fibers, copper powder, a copper-containing alloy (such as brass or bronze), and a copper-containing compound as a raw material for the friction material composition.

(Titanate Compound Powder)

The alkali metal ion dissolution rate of the titanate compound powder for use in the present invention need only be not more than 15.0% by mass, but preferably 0.01% by mass to 15.0% by mass, more preferably 0.05% by mass to 10.0% by mass, still more preferably 0.1% by mass to 5.0% by mass, and particularly preferably 0.1% by mass to 2.5% by mass. The term alkali metal ion dissolution rate in the present invention refers to the percentage by mass of alkali metal ions eluted from the titanate compound powder in water at 80° C. into the water.

In a curing reaction of a novolac-type phenolic resin as an example of a thermosetting resin for use in the friction material composition, a curing accelerator, for example, hexamethylenetetramine, opens its ring and binds to a hydroxyl group in the novolac-type phenolic resin, thus initiating the curing reaction. However, if in doing so alkali metal ions exist, it can be assumed that the alkali metal ions undergo an ion-exchange reaction with hydrogen ions in hydroxyl groups of the novolac-type phenolic resin to inhibit the binding of hexamethylenetetramine (curing accelerator) to the novolac-type phenolic resin (thermosetting resin) (cause curing inhibition).

Furthermore, copper, which is used in a conventional friction material composition, has high thermal conductivity and therefore has the function of, during hot forming of the friction material composition, rapidly transmitting the quantity of heat necessary for thermal curing of a thermosetting resin to a central portion of the friction material composition. However, if the friction material composition is free of copper component or has a small content of copper component, the transmission of the quantity of heat to the central portion of the friction material composition during hot forming of the friction material composition becomes slow, so that the thermosetting resin in the central portion of the resultant formed body is likely to remain uncured.

Unlike the above, in the present invention, since the alkali metal ion dissolution rate of the titanate compound powder is 15.0% by mass or less, such curing inhibition between the thermosetting resin and the curing accelerator as described above is less likely to occur, so that the curing of the thermosetting resin can be accelerated. Therefore, even when the friction material composition is free of copper component or has a small content of copper component, the thermal curing of the thermosetting resin can be accelerated to the central portion of the formed body.

For the above reason, when the friction material composition is free of copper component or has a small content of copper component, the titanate compound powder having an alkali metal ion dissolution rate in the above range is used.

Examples of the titanate compound powder for use in the present invention include powders of titanate compounds (titanate compound particles) of at least one element selected from the group consisting of alkali metals except for Li (hereinafter, these alkali metal elements are referred to collectively as an "element A"). Such alkali metal titanate compounds have crystal structures, such as a layered structure and a tunnel structure, in which $TiO_6$ octahedrons or $TiO_5$ trigonal bipyramids are joined together while sharing ridge lines. Ions of the element A are located between layers of the layered structure or in tunnels of the tunnel structure. In addition to the ions of the element A, ions of an alkaline earth metal may be located between layers of the layered structure or in tunnels of the tunnel structure.

Examples of the element A include Na, K, Rb, Cs, and Fr and the element A is preferably Na and/or K. Note that Li has a smaller ionic radius than other alkali metals and therefore has different characteristics from the other alkali metals. Hence, Li is not included in the element A. Examples of the alkaline earth metal include Ca, Sr, Ba, and Ra.

In the above titanate compound for use in the present invention, Ti sites may be partly substituted by at least one element selected from among Li, Mg, Zn, Ga, Ni, Cu, Fe, Al, and Mn (hereinafter, these elements are referred to collectively as an "element M"). The element M is preferably Li, Mg, Zn, Ga, Ni, Fe, Al, and/or Mn from an environmental viewpoint. From the viewpoint of further increasing the frictional properties, the element M is more preferably Li and/or Mg. Because ions of the element M have an ionic radius comparable to $Ti^{4+}$, Ti can be substituted by the element M.

Examples of the above titanate compound include titanate compounds having a tunnel crystal structure represented by, for example, a general formula $A_2Ti_nO_{(2n+1)}$ [where A represents at least one of alkali metals except for Li and n is a value from 4 to 11] or a general formula $A_{(2+y)}Ti_{(6-x)}M_xO_{(13+y/2-(4-z)x/2)}$ [where A represents at least one of alkali metals except for Li, M represents at least one selected from among Li, Mg, Zn, Ga, Ni, Cu, Fe, Al, and Mn, z represents a valence of the element M and is an integer from 1 to 3, $0.05 \leq x \leq 0.5$, and $0 \leq y \leq (4-z)x$].

Other examples of the above titanate compound include titanate compounds having a layered crystal structure represented by a general formula $A_xM_yTi_{(2-y)}O_4$ [where A represents at least one of alkali metals except for Li, M represents at least one selected from among Li, Mg, Zn, Ga, Ni, Cu, Fe, Al, and Mn, x is a value from 0.5 to 1.0, and y is a value from 0.25 to 1.0], a general formula $A_{0.5-0.7}Li_{0.27}Ti_{1.73}O_{3.85-3.95}$ [where A represents at least one of alkali metals except for Li], a general formula $A_{0.2-0.7}Mg_{0.40}Ti_{1.6}O_{3.7-3.95}$ [where A represents at least one of alkali metals except for Li], or a general formula $A_{0.5-0.7}Li_{(0.27-x)}M_yTi_{(1.73-z)}O_{3.85-3.95}$ [where A represents at least one of alkali metals except for Li, M represents at least one selected from among Mg, Zn, Ga, Ni, Cu, Fe, Al, and Mn (as for M composed of two or more types of metals, excepting any combination of ions having different valences), as for M being a divalent metal, $x=2y/3$ and $z=y/3$, as for M being a trivalent metal, $x=y/3$ and $z=2y/3$, and $0.004 \leq y \leq 0.4$].

The above titanate compound preferably has a composition free of copper elements from an environmental viewpoint. Such a titanate compound is preferably, for example, at least one selected from among $A_2Ti_nO_{(2n+1)}$ [where A represents at least one of alkali metals except for Li and n is a value from 4 to 11], $A_{(2+y)}Ti_{(6-x)}M_xO_{(13+y/2-(4-z)x/2)}$ [where A represents at least one of alkali metals except for Li, M represents at least one selected from among Li, Mg, Zn, Ga, Ni, Fe, Al, and Mn, z represents a valence of the element M and is an integer from 1 to 3, $0.05 \leq x \leq 0.5$, and $0 \leq y \leq (4-z)x$], $A_xM_yTi_{(2-y)}O_4$ [where A represents at least one of alkali metals except for Li, M represents at least one selected from among Li, Mg, Zn, Ga, Ni, Fe, Al, and Mn, x is a value from 0.5 to 1.0, and y is a value from 0.25 to 1.0], $A_{0.5-0.7}Li_{0.27}Ti_{1.73}O_{3.85-3.95}$ [where A represents at least one of alkali metals except for Li], $A_{0.2-0.7}Mg_{0.40}Ti_{1.6}O_{3.7-3.95}$ [where A represents at least one of alkali metals except for Li]; and $A_{0.5-0.7}Li_{(0.27-x)}M_yTi_{(1.73-z)}O_{3.85-3.95}$ [where A represents at least one of alkali metals except for Li, M represents at least one selected from among Mg, Zn, Ga, Ni, Fe, Al, and Mn (as for M composed of two or more types of metals, excepting any combination of ions having different valences), as for M being a divalent metal, $x=2y/3$ and $z=y/3$, as for M being a trivalent metal, $x=y/3$ and $z=2y/3$, and $0.004 \leq y \leq 0.4$].

Specific examples of the above titanate compound for use in the present invention include $K_2Ti_{4.8}O_{10.6}$ (potassium 4.8-titanate), $K_2Ti_6O_{13}$ (potassium hexatitanate), $K_2Ti_{6.1}O_{13.2}$ (potassium 6.1-titanate), $K_2Ti_{7.9}O_{16.8}$ (potassium 7.9-titanate), $K_2Ti_8O_{17}$ (potassium octatitanate), $K_2Ti_{10.9}O_{22.8}$ (potassium 10.9-titanate), $Na_2Ti_6O_{13}$ (sodium hexatitanate), $Na_2Ti_8O_{17}$ (sodium octatitanate), $K_{0.8}Li_{0.27}Ti_{1.73}O_4$ (lithium potassium titanate), $K_{2.15}Ti_{5.85}Al_{0.15}O_{13.0}$ (aluminum potassium titanate), $K_{2.20}Ti_{5.60}Al_{0.40}O_{12.9}$ (aluminum potassium titanate), $K_{2.21}Ti_{5.90}Li_{0.10}O_{12.9}$ (lithium potassium titanate), $K_{0.8}Li_{0.27}Ti_{1.73}O_4$ (lithium potassium titanate), $K_{0.7}Li_{0.27}Ti_{1.73}O_{3.95}$ (lithium potassium titanate), $K_{0.8}Mg_{0.4}Ti_{1.6}O_4$ (magnesium potassium titanate), $K_{0.7}Mg_{0.4}Ti_{1.6}O_{3.95}$ (magnesium potassium titanate), $K_{0.7}Li_{0.13}Mg_{0.2}Ti_{1.67}O_{3.95}$ (lithium magnesium potassium titanate), $K_{0.7}Li_{0.24}Mg_{0.04}Ti_{1.72}O_{3.95}$ (lithium magnesium potassium titanate), and $K_{0.7}Li_{0.13}Fe_{0.4}Ti_{1.47}O_{3.95}$ (lithium iron potassium titanate).

As for the above titanate compound for use in the present invention, its crystal structure is preferably a tunnel structure from the viewpoint of further decreasing the alkali metal ion dissolution rate and preferably a layered structure from the viewpoint of further increasing the wear resistance in the high-temperature range.

In the present invention, provided that the alkali metal ion dissolution rate is in the above range, at least one of the above titanate compounds can be appropriately selected according to desired properties of a friction material. Furthermore, a titanate compound having a tunnel structure as described above and a titanate compound having a layered structure as described above can also be used in combination.

Titanate compound particles forming the titanate compound powder for use in the present invention are non-fibrous particles, including spherical, granular, platy, bar-like (inclusive of an approximately bar-like shape as a whole, such as rodlike, columnar, prismoidal, reed-shaped, approximately columnar, and approximately reed-shaped), blocky, porous, and shapes with multiple projections (such as amoeboid, boomerang-like, cross, and kompeito-like). Preferred among them are bar-like particles and particles having a particle shape with multiple projections from the viewpoint of further increasing the strength of the friction material in the high-temperature range. These various kinds of particle shapes can be arbitrarily controlled depending on production conditions, particularly, the composition of raw materials, firing conditions, and so on. The term "with multiple projections" herein means that the shape of particles projected onto a plane is different at least from a normal polygon, circle, ellipse, and so on, and the particles are those that can take on a shape having projections in two or more directions, or have a so-called irregular shape. More specifically, the projections correspond to portions projected from a polygon, circle, ellipse or the like (i.e., a basic shape) applied to a photograph (projected FIGURE) captured by a scanning electron microscope (SEM).

The shape of the above titanate compound particles can be analyzed, for example, by observation with a scanning electron microscope (SEM).

Fibrous particles in the present invention refer to particles in which L/B and L/T are 5 or more where L represents a length which is the longest side of, among cuboids (circumscribing cuboids) circumscribing the particle, a cuboid having the minimum volume, B represents a breadth which is the second longest side of the cuboid, and T represents a thickness which is the shortest side of the cuboid (provided, however, that B>T). Furthermore, non-fibrous particles herein refer to particles other than fibrous particles and particles having an L/B of less than 5.

The average particle diameter of the titanate compound powder is, for example, 1.0 μm to 150.0 μm, preferably 2.0 μm to 120.0 μm, more preferably 3.0 μm to 100.0 μm, and still more preferably 3.0 μm to 40.0 μm. When the average particle diameter is in the above range, the frictional properties of the friction material can be further increased. The titanate compound particles also include those in which secondary particles are formed because of difficulty of monodispersion of primary particles, and a material granulated from the particles.

The average particle diameter can be measured by the laser diffraction method. The average particle diameter above refers to a particle diameter at a volume-based cumulative value of 50% in a particle size distribution measured by the laser diffraction method (a volume-based 50% cumulative particle diameter), i.e., $D_{50}$ (a median diameter). This volume-based 50% cumulative particle diameter ($D_{50}$) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

Likewise, a volume-based 10% cumulative particle diameter ($D_{10}$) and a volume-based 90% cumulative particle diameter ($D_{90}$) are respective particle diameters at cumulative values of 10% and 90% in the cumulative curve of the determined particle size distribution, the cumulative curve assuming the total volume of particles to be 100%, where during accumulation the number of particles is counted from a smaller size side. Therefore, the ratio between $D_{90}$ and $D_{10}$ ($D_{90}/D_{10}$) can be said to be an index indicating the breadth of the particle size distribution. As the value of $D_{90}/D_{10}$ is greater, the titanate compound powder has a wider particle size distribution. Furthermore, as the value of $D_{90}/D_{10}$ is closer to 1, the titanate compound powder has a particle size distribution closer to monodispersity.

In the titanate compound powder for use in the present invention, the value of $D_{90}/D_{10}$ is, for example, 30.0 or less and preferably in a range of 1.0 to 15.0. When the value of $D_{90}/D_{10}$ is in the above range, the frictional properties of the friction material can be further increased.

The specific surface area of the titanate compound powder for use in the present invention is preferably 0.3 m$^2$/g to 7.0 m$^2$/g and more preferably 0.3 m$^2$/g to 3.0 m$^2$/g. The specific surface area can be measured in conformity with JIS Z8830. If the specific surface area is too large, the area wetted with the thermosetting resin may become too large, so that the amount of thermosetting resin involved in the overall strength of the friction material may be small. Furthermore, with the use of the friction material for a brake pad, because of a small amount of thermosetting resin contained in the friction material, an excessively large specific surface area of the titanate compound powder may decrease the mechanical strength of the friction material. By adjusting the specific surface area of the titanate compound powder within the above range, a friction material can be obtained which achieves a better balance between the mechanical strength and the frictional properties.

Meanwhile, if the sulfate ion concentration of the friction material is high, the friction material easily gets rusted. In a production process of raw materials for the titanate compound powder, a production process of the titanate compound, and like processes, sulfate ions may be a residual. Therefore, the sulfate ion dissolution rate of the titanate compound powder is preferably 0.2% by mass or less and more preferably 0.1% by mass or less.

As just described, the friction material composition is required not only to be free of copper component or have a small content of copper component, but also to contain a small amount of sulfate ions. It can be considered that in such a case the curing reaction of the thermosetting resin is significantly susceptible to the alkali metal ion dissolution rate of the titanate compound powder. The term sulfate ion dissolution rate in the present invention refers to the percentage by mass of sulfate ions eluted from the titanate compound powder at room temperature (20° C.) into water.

For the purposes of further increasing dispersibility and further increasing adhesion to the thermosetting resin, the titanate compound powder for use in the present invention may be subjected to surface treatment with a silane coupling agent (such as an aminosilane coupling agent), a titanate-based coupling agent or the like in an ordinary method.

The content of titanate compound powder in the friction material composition is preferably 1% by mass to 40% by mass, more preferably 5% by mass to 35% by mass, and still more preferably 10% by mass to 30% by mass, relative to a total amount of 100% by mass of the friction material composition. By adjusting the content of the titanate compound powder within the above range, the friction material can achieve more excellent frictional properties.

(Barium Sulfate Powder)

In barium sulfate powder made of barium sulfate particles for use in the present invention, the volume-based 50% cumulative particle diameter ($D_{50}$) is 0.1 μm to 20.0 μm, preferably 0.1 μm to 10.0 μm, more preferably 0.3 μm to 5.0 μm, and still more preferably 0.5 μm to 3.0 μm. The barium sulfate particles also include those in which secondary particles are formed because of difficulty of monodispersion of primary particles, and a material granulated from the particles.

With the use of barium sulfate powder having a small volume-based 50% cumulative particle diameter ($D_{50}$), the barium sulfate powder is more likely to be filled in spaces between particles forming the friction material composition during hot forming, so that the friction material composition is made dense. Therefore, voids between particles forming the friction material composition can be reduced, so that the conductivity of heat from a forming die to the friction material composition increases. In addition, by a combination of the barium sulfate powder with the titanate compound powder having an alkali metal ion dissolution rate in the above range, a synergetic effect with the reduction in inhibition of the thermally curing reaction of the thermosetting resin, such as a phenolic resin, improves the yield rate of the friction material composition upon forming even when the friction material composition is free of copper component or has a small content of copper component. Furthermore, the compressive deformation rate of the resultant friction material can be reduced, the coefficient of friction of the friction material can be increased, and the amount of wear of the friction material can be reduced.

Since the resultant friction material can have a small compressive deformation rate, with the use of the friction material for a brake system, the amount of deformation of the friction material in a direction where a piston presses against the friction material during braking can be reduced. Since the amount of deformation of the friction material can be reduced, a reduction in the responsiveness of the brake system and an attendant reduction in the feeling of working of the brake system are less likely to occur. Furthermore, a reduction in fuel economy and an increase in wear are less likely to occur.

Therefore, the friction material composition according to the present invention can be suitably used for brake systems.

In the barium sulfate powder for use in the present invention, the volume-based 90% cumulative particle diameter ($D_{90}$) is preferably 0.1 µm to 20.0 µm, more preferably 0.1 µm to 10.0 µm, and still more preferably 1.0 µm to 5.0 µm. By adjusting $D_{90}$ within the above range, the amount of coarse particles in the barium sulfate powder becomes small, so that the compressive deformation rate can be further reduced.

In the barium sulfate powder for use in the present invention, the value of $D_{90}/D_{10}$ is, for example, 20.0 or less and preferably in a range of 1.0 to 10.0. When the value of $D_{90}/D_{10}$ is in the above range, the frictional properties of the friction material can be further increased.

Barium sulfate powder includes: ground barium sulfate powder (barite powder) obtained by grinding a mineral called barite, deironing the ground product, and elutriating it; and precipitated barium sulfate powder obtained by artificial synthesis. Precipitated barium sulfate powder can be controlled in particle size depending on conditions during synthesis. Thus, desired fine barium sulfate powder having a small content of coarse particles can be produced. From the viewpoint of further reducing impurities and further homogenizing the particle size distribution of barium sulfate particles, precipitated barium sulfate powder is preferably used.

The content of the barium sulfate powder is preferably 1% by mass to 50% by mass, more preferably 5% by mass to 40% by mass, and still more preferably 10% by mass to 30% by mass, relative to a total amount of 100% by mass of the friction material composition. By adjusting the content of the barium sulfate powder within the above range, the friction material can achieve more excellent frictional properties.

(Thermosetting Resin)

The thermosetting resin is used as a binder capable of being integrated with the titanate compound particles and so on to give strength. Therefore, the thermosetting resin that can be used is an arbitrary one appropriately selected from among known thermosetting resins for use as binders.

Examples of the thermosetting resin include: phenolic resins; elastomer-dispersed phenolic resins, such as acrylic elastomer-dispersed phenolic resins and silicone elastomer-dispersed phenolic resins; modified phenolic resins, such as acrylic-modified phenolic resins and silicone-modified phenolic resins; formaldehyde resins; melamine resins; epoxy resins; acrylic resins; aromatic polyester resins; and urea resins. These resins can be used singly or in combination of two or more thereof. Preferred among them are phenolic resins (straight phenolic resins) and modified phenolic resins from the viewpoint of enabling further improvement in thermal resistance, formability, and frictional properties.

The content of the thermosetting resin in the friction material composition is preferably 5% by mass to 20% by mass relative to a total amount of 100% by mass of the friction material composition. By adjusting the content of the thermosetting resin within the above range, spaces between mixed materials are filled with a suitable amount of binder, so that more excellent frictional properties can be achieved.

(Other Materials)

The friction material composition according to the present invention may contain, in addition to the titanate compound powder, the barium sulfate powder, and the thermosetting resin, other materials as necessary. Examples of the other materials include a fibrous base material and a friction modifier as will be described below.

Examples of the fibrous base material include: organic fibers, such as aromatic polyamide (aramid) fibers, fibrillated aramid fibers, acrylic fibers (homopolymeric or copolymeric fibers made mainly from acrylonitrile), fibrillated acrylic fibers, cellulose fibers, fibrillated cellulose fibers, and phenolic resin fibers; straight or curled metal fibers containing metal as a main component, such as fibers made of a metal alone or in an alloy form of alumina, iron, zinc, tin, titanium, nickel, magnesium, silicon or other metals except for copper and copper alloys, and cast iron fibers; inorganic fibers other than titanate fibers, such as glass fibers, rock wool, ceramic fibers, biodegradable ceramic fibers, biodegradable mineral fibers, biosoluble fibers, wollastonite fibers, silicate fibers, and mineral fibers; and carbon-based fibers, such as flame-resistant fibers, PAN-based carbon fibers, pitch-based carbon fibers, and activated carbon fibers. These various kinds of fibers may be used singly or in combination of two or more thereof.

Examples of the friction modifier include: unvulcanized or vulcanized rubber powders, such as tire rubber, acrylic rubber, isoprene rubber, NBR (nitrile-butadiene rubber), SBR (styrene-butadiene rubber), chlorinated butyl rubber, butyl rubber, and silicone rubber; organic fillers, such as cashew dust and melamine dust; inorganic powders, such as calcium carbonate, sodium carbonate, lithium carbonate, calcium hydroxide (hydrated lime), vermiculite, clay, mica, talc, dolomite, chromite, and mullite; inorganic fillers, such as metal powders of a metal alone or in an alloy form of aluminum, zinc, iron, tin or other metals except for copper and copper alloys; abrasive materials, such as silicon carbide, titanium oxide, alumina (aluminum oxide), silica (silicon dioxide), magnesia (magnesium oxide), zirconia (zirconium oxide), zirconium silicate, chromium oxide, iron oxide, chromite, and quartz; and solid lubricants, such as synthetic or natural graphite, phosphate-coated graphite, carbon black, coke, antimony trisulfide, molybdenum disulfide, tin sulfide, iron sulfide, zinc sulfide, bismuth sulfide, tungsten disulfide, and polytetrafluoroethylene (PTEF). These friction modifiers can be used singly or in combination of two or more thereof.

The content of the other materials in the friction material composition is preferably 44% by mass to 93% by mass relative to a total amount of 100% by mass of the friction material composition.

(Method for Producing Friction Material Composition)

The friction material composition according to the present invention can be produced by, for example, (1) the method of mixing components with a mixer, such as a Lodige mixer (Lodige is a registered mark), a pressure kneader or an Eirich mixer (Eirich is a registered mark), or (2) the method of preparing a granulated material of desired components and, if necessary, mixing it together with other components using a mixer, such as a Lodige mixer, a pressure kneader or an Eirich mixer.

The content of each component in the friction material composition according to the present invention can be appropriately selected depending on the desired frictional properties and the friction material composition can be produced by the above-described production methods.

Alternatively, the friction material composition according to the present invention may be prepared by producing a master batch containing a particular component at a high concentration, adding a thermosetting resin and so on to the master batch, and mixing them.

<Friction Material and Friction Member>

In the present invention, a friction material having a predetermined shape can be produced by preliminarily forming the above friction material composition at ordinary temperature (20° C.), forming the resultant preform by the application of heat and pressure (at a forming pressure of 10 MPa to 40 MPa and a forming temperature of 150° C. to 200° C.), subjecting, if necessary, the resultant formed body to heat treatment (holding it at 150° C. to 220° C. for 1 hour to 12 hours) in a furnace, and then subjecting the formed body to machining and polishing processes.

The friction material according to the present invention is used as a friction member formed so that the friction material forms a friction surface. Examples of the friction member formable using a friction material include: (1) a structure composed of the friction material alone; and (2) a structure including a substrate, such as a back metal, and the friction material according to the present invention provided on the substrate and providing a friction surface.

The substrate is used in order to further increase the mechanical strength of the friction member, wherein metal, fiber-reinforced resin or other materials can be used as the material for the substrate. Examples of the material include iron, stainless steel, glass fiber-reinforced resin, and carbon fiber-reinforced resin.

A friction material generally has a large number of microscopic pores formed inside thereof and these pores serve as escape routes for decomposition products (gas and liquid substances) at high temperatures to prevent reduction in frictional properties and concurrently reduce the stiffness of the friction material and increase the damping performance thereof, thus preventing the occurrence of squeal. In a normal friction material, the mixing and forming conditions of the materials are controlled so that the porosity is 5% to 30%.

Since the friction member according to the present invention is formed of the above-described friction material composition according to the present invention, the friction member has a high coefficient of friction, a small compressive deformation rate, and excellent wear resistance, even when being free of copper component or having a small content of copper component. Therefore, the friction member according to the present invention can be suitably used in all brake systems for various types of vehicles, industrial machines, and so on, such as a brake lining or a disc pad each constituting part of a braking device or a clutch facing. In particular, the friction member can be more suitably used in electric-powered brake systems, such as a regenerative brake system.

EXAMPLES

The present invention will be described below in further detail with reference to specific examples.

The present invention is not at all limited by the following examples and modifications and variations may be appropriately made therein without changing the gist of the invention.

Titanate compounds 1 to 11 which are titanate compound powders used in Examples and Comparative Examples are shown in Table 1, while barium sulfates 1 to 2 which are barium sulfate powders used in Examples and Comparative Examples are shown in Table 2.

Furthermore, a thermosetting resin and other additives used in Examples and Comparative Examples are as described below.

TABLE 1

| Titanate Compound Powder | Composition | Crystal Structure | Alkali Metal Ion Dissolution Rate (% by mass) | Water Dispersion pH | Sulfate Ion Dissolution Rate (% by mass) | Particle Shape |
|---|---|---|---|---|---|---|
| Titanate Compound 1 | Potassium Octatitanate | tunnel | 0.20 | 9.8 | 0.12 | platy |
| Titanate Compound 2 | Potassium Octatitanate | tunnel | 0.10 | 9.8 | 0.06 | platy |
| Titanate Compound 3 | Potassium Octatitanate | tunnel | 0.70 | 10.6 | 0.07 | amoeboid |
| Titanate Compound 4 | Potassium Hexatitanate | tunnel | 0.25 | 10.5 | 0.09 | porous |
| Titanate Compound 5 | Lithium Potassium Titanate | layered | 2.10 | 10.6 | 0.00 | platy |
| Titanate Compound 6 | Magnesium Potassium Titanate | layered | 3.60 | 10.6 | 0.00 | platy |
| Titanate Compound 7 | Magnesium Potassium Titanate | layered | 4.50 | 10.8 | 0.00 | platy |
| Titanate Compound 8 | Potassium Octatitanate | tunnel | 0.54 | 10.2 | 0.02 | bar-like |
| Titanate Compound 9 | Potassium Rexatitanate | tunnel | 0.28 | 10.3 | 0.02 | bar-like |
| Titanate Compound 10 | Sodium Hexatitanate | tunnel | 0.11 | 10.3 | 0.01 | porous |
| Titanate Compound 11 | Potassium Dititanate | layered | 19.00 | 12.6 | 0.01 | amoeboid |

TABLE 1-continued

|  | Particle Diameter | | | | Specific Surface Area | | |
|---|---|---|---|---|---|---|---|
| Titanate Compound Powder | $D_{10}$ (μm) | $D_{50}$ (μm) | $D_{90}$ (μm) | $D_{90}/D_{10}$ | ($m^2/g$) | Product Name | Manufacturer |
| Titanate Compound 1 | 6.2 | 32.2 | 70.2 | 11.3 | 2.40 | Terracess TP-L | Otsuka Chemical |
| Titanate Compound 2 | 3.1 | 7.0 | 13.8 | 4.5 | 3.93 | Terracess TP-S | Otsuka Chemical |
| Titanate Compound 3 | 4.8 | 9.3 | 17.8 | 3.7 | 6.99 | Terracess JP | Otsuka Chemical |
| Titanate Compound 4 | 7.8 | 81.9 | 220.9 | 28.2 | 5.13 | Terracess DP-A | Otsuka Chemical |
| Titanate Compound 5 | 4.5 | 16.4 | 38.1 | 8.5 | 0.81 | Terracess L | Otsuka Chemical |
| Titanate Compound 6 | 3.5 | 6.9 | 12.6 | 3.6 | 1.26 | Terracess PM | Otsuka Chemical |
| Titanate Compound 7 | 2.1 | 4.0 | 7.4 | 3.5 | 1.44 | Terracess PS | Otsuka Chemical |
| Titanate Compound 8 | 12.8 | 35.8 | 74.4 | 5.8 | 5.61 | Terracess JP-L | Otsuka Chemical |
| Titanate Compound 9 | 13.3 | 35.9 | 79.4 | 6.0 | 0.94 | Terracess JSL | Otsuka Chemical |
| Titanate Compound 10 | 7.4 | 42.6 | 123.9 | 16.8 | 4.22 | Terracess DSR | Otsuka Chemical |
| Titanate Compound 11 | 6.6 | 14.0 | 27.4 | 4.2 | 0.38 | — | — |

TABLE 2

| Barium Sulfate Powder | Alkali Metal Ion Dissolution Rate (% by mass) | Particle Diameter | | | $D_{90}/D_{10}$ | Product Name | Manufacturer |
|---|---|---|---|---|---|---|---|
| | | $D_{10}$ (μm) | $D_{50}$ (μm) | $D_{90}$ (μm) | | | |
| Barium Sulfate 1 | 0.0 | 0.7 | 1.6 | 3.5 | 5.0 | Barium sulfate MBH-100 | Sakai Chemical Industry |
| Barium Sulfate 2 | 0.0 | 4.0 | 23.7 | 46.2 | 11.6 | Barium sulfate BA | Sakai Chemical Industry |

Phenolic resin: Hexamethylenetetramine-compounded novolac-type phenolic resin,
Cashew dust,
Artificial graphite,
Mica,
Iron oxide,
Zirconium oxide,
Antimony sulfide,
Calcium hydroxide,
Fibrillated aramid fibers, and
Copper fibers.

Examples 1 to 10 and Comparative Examples 1 to 6

Materials were compounded at each compounding ratio described in Table 3 and mixed for three minutes with an Eirich mixer. A pressure of 15 MPa was applied to the obtained mixture at ordinary temperature (20° C.) for five seconds, thus preparing a preform. The preform was inserted into a cavity of a hot forming die heated to 150° C., a back plate (material: steel) having an adhesive applied thereon was placed on the preform, and a pressure of 20 MPa was applied for 300 seconds to the preform with the back plate placed thereon. A degassing process was performed five times between the elapse of 60 seconds and the elapse of 90 seconds, both measured from the start of the application of pressure. The obtained friction material member was put into a thermostatic oven heated to 220° C. and held for two hours therein to fully cure it, thus obtaining a friction member.

<Evaluations of Titanate Compound Powder and Barium Sulfate Powder>

(Alkali Metal Ion Dissolution Rate)

The mass (X) of a test sample was measured, the test sample was then added into distilled water to prepare a 1% by mass slurry, the slurry was stirred at 80° C. for four hours, and the solid content was then removed from the slurry with a membrane filter having a bore size of 0.2 μm, thus obtaining an extraction liquid. Alkali metal (Y) in the obtained extraction liquid was measured with an ion chromatograph (product number "ICS-1100" manufactured by Dionex). Subsequently, using the values of (X) and (Y), the alkali metal ion dissolution rate (% by mass) was calculated based on the formula [(Y)/(X)]×100.

(Water Dispersion pH)

An amount of 1 g of a test sample was added into 100 mL of distilled water to prepare a 1% by mass slurry and the obtained slurry was measured in terms of pH (at a temperature of 20° C.) with a pH meter (product number "F21" manufactured by Horiba, Ltd.), thus obtaining a water dispersion pH.

(Sulfate Ion Dissolution Rate)

The mass (X) of a test sample was measured, the test sample was then added into distilled water to prepare a 1% by mass slurry, the slurry was stirred at 20° C. for 24 hours, and the solid content was then removed from the slurry with a membrane filter having a bore size of 0.2 μm, thus obtaining an extraction liquid. Sulfate ions (Y) in the obtained extraction liquid were measured with an ion chromatograph (product number "INTEGRIPN HPIC" manufactured by Thermo Fisher Scientific, Inc.). Subsequently, using the values of (X) and (Y), the sulfate ion dissolution rate (% by mass) was calculated based on the formula [(Y)/(X)]×100.

(Particle Shape)

The particle shape was observed with a scanning electron microscope (product number "S-4800" manufactured by Hitachi High-Technologies Corporation).

(Particle Diameter)

The particle diameter was measured with a laser diffraction particle size distribution measurement device (product number "SALD-2100" manufactured by Shimadzu Corporation).

Specifically, the particle diameter at a volume-based cumulative value of 50% in a particle size distribution measured with the laser diffraction particle size distribution measurement device, i.e., $D_{50}$ (a median diameter), was obtained.

The particle diameter at a volume-based cumulative value of 10% in the particle size distribution measured with the laser diffraction particle size distribution measurement device, i.e., $D_{10}$, was obtained.

The particle diameter at a volume-based cumulative value of 90% in the particle size distribution measured with the laser diffraction particle size distribution measurement device, i.e., $D_{90}$, was obtained.

Furthermore, $D_{90}/D_{10}$ was obtained from the ratio between $D_{90}$ and $D_{10}$.

(Specific Surface Area)

The specific surface area was measured with an automatic specific surface area measurement device (product number "TriStar II 3020" manufactured by Micromeritics Instrument Corporation).

<Evaluations of Friction Member>

(Forming Yield Rate)

After the hot forming at 150° C., the friction members after the hot forming were visually checked for forming defects due to bulging and cracking and the rate of the number of friction members having caused no forming defect to the number of friction members obtained by the hot forming was calculated as a forming yield rate.

(Porosity)

The porosity was measured in conformity with the method defined in JIS D4421.

(Compressive Deformation Rate)

A test was conducted based on ISO 6310 (Automotive parts—Brake linings and disc brake pads—Compressive strain test method). The thickness (t) of a portion of a friction member formed of a friction material composition and the amount (h) of deformation of the friction member when compressed to a pressure of 4 MPa were measured, the amount (h') of deformation of a back plate when compressed to a pressure of 4 MPa was separately measured, and a compressive deformation rate was obtained by solving the formula $[(h-h')/(t)] \times 100$.

(Rockwell Hardness)

The Rockwell hardness was measured in conformity with the method defined in JIS D4421. S scale was used as a scale for hardness.

(Frictional Properties)

The surfaces (frictional surfaces) of the friction members produced in Examples 1 to 10 and Comparative Examples 1 to 6 were polished 1.0 mm and the friction members were then subjected to a braking efficacy test based on SAE J2522, thus obtaining respective coefficients of friction.

A wear test was conducted based on SAE J2707 (block wear test), the amount of wear of each friction material was obtained from a reduction in the thickness of the portion of the friction member formed of a friction material composition between before and after the test, and the amount of wear of each rotor was obtained from a reduction in the weight of the rotor between before and after the test. Cast-iron rotors belonging to type A in the ASTM standard were used as the rotors.

The results are shown in Table 3 below.

TABLE 3

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Friction Material Composition (% by mass) | Binder | Phenolic resin | 9.4 | 9.4 | 9.4 | 9.4 | 9.4 | 9.4 | 9.4 | 9.4 | 9.4 | 9.4 |
| | Friction modifier | Cashew dust | 6.8 | 6.8 | 6.8 | 6.8 | 6.8 | 6.8 | 6.8 | 6.8 | 6.8 | 6.8 |
| | | Titanate compound 1 | 18.7 | — | — | — | — | — | — | — | — | — |
| | | Titanate compound 2 | — | 18.7 | — | — | — | — | — | — | — | — |
| | | Titanate compound 3 | — | — | 18.7 | — | — | — | — | — | — | — |
| | | Titanate compound 4 | — | — | — | 18.7 | — | — | — | — | — | — |
| | | Titanate compound 5 | — | — | — | — | 18.7 | — | — | — | — | — |
| | | Titanate compound 6 | — | — | — | — | — | 18.7 | — | — | — | — |
| | | Titanate compound 7 | — | — | — | — | — | — | 18.7 | — | — | — |
| | | Titanate compound 8 | — | — | — | — | — | — | — | 18.7 | — | — |
| | | Titanate compound 9 | — | — | — | — | — | — | — | — | 18.7 | — |
| | | Titanate compound 10 | — | — | — | — | — | — | — | — | — | 18.7 |
| | | Titanate compound 11 | — | — | — | — | — | — | — | — | — | — |
| | | Barium sulfate 1 | 17.9 | 17.9 | 17.9 | 17.9 | 17.9 | 17.9 | 17.9 | 17.9 | 17.9 | 17.9 |
| | | Barium sulfate 2 | — | — | — | — | — | — | — | — | — | — |
| | | Artificial graphite | 1.9 | 1.9 | 1.9 | 1.9 | 1.9 | 1.9 | 1.9 | 1.9 | 1.9 | 1.9 |
| | | Mica | 15.4 | 15.4 | 15.4 | 15.4 | 15.4 | 15.4 | 15.4 | 15.4 | 15.4 | 15.4 |
| | | Iron oxide | 18.7 | 18.7 | 18.7 | 18.7 | 18.7 | 18.7 | 18.7 | 18.7 | 18.7 | 18.7 |
| | | Zirconium oxide | 4.3 | 4.3 | 4.3 | 4.3 | 4.3 | 4.3 | 4.3 | 4.3 | 4.3 | 4.3 |
| | | Antimony sulfide | 4.6 | 4.6 | 4.6 | 4.6 | 4.6 | 4.6 | 4.6 | 4.6 | 4.6 | 4.6 |
| | | Calcium hydroxide | 1.0 | 1.0 | 1.0 | 1.0 | 1.0 | 1.0 | 1.0 | 1.0 | 1.0 | 1.0 |
| | Fibrous base material | Fibrillated aramid fibers | 1.3 | 1.3 | 1.3 | 1.3 | 1.3 | 1.3 | 1.3 | 1.3 | 1.3 | 1.3 |
| | | Copper fibers | — | — | — | — | — | — | — | — | — | — |
| Content of Copper Component (% by mass) | | | 0.0 | 0.0 | 0.0 | 0.0 | 0.0 | 0.0 | 0.0 | 0.0 | 0.0 | 0.0 |
| Evaluations | Forming Yield Rate (%) | | 100 | 100 | 100 | 100 | 100 | 100 | 100 | 100 | 100 | 100 |
| | Compressive Deformation Rate (%) | | 1.0 | 1.2 | 1.2 | 1.4 | 1.3 | 1.9 | 1.9 | 1.2 | 1.0 | 1.0 |
| | Porosity (%) | | 21 | 21 | 21 | 25 | 19 | 19 | 19 | 23 | 22 | 28 |
| | Rockwell Hardness (HRS) | | 56 | 47 | 51 | 45 | 50 | 38 | 45 | 52 | 53 | 49 |
| | Average Coefficient of Friction | | 0.39 | 0.39 | 0.39 | 0.40 | 0.36 | 0.37 | 0.38 | 0.40 | 0.41 | 0.42 |
| | Amount of Friction Material Wear (mm) | | 0.80 | 0.84 | 0.82 | 0.90 | 0.58 | 0.66 | 0.74 | 0.69 | 0.63 | 0.75 |
| | Amount of Rotor Wear (mg) | | 1.0 | 1.1 | 1.1 | 1.8 | 1.1 | 0.8 | 0.6 | 1.1 | 1.0 | 1.3 |

TABLE 3-continued

|  |  |  | Comparative Examples | | | | | |
|---|---|---|---|---|---|---|---|---|
|  |  |  | 1 | 2 | 3 | 4 | 5 | 6 |
| Friction Material Composition (% by mass) | Binder | Phenolic resin | 9.4 | 9.4 | 9.1 | 9.1 | 9.1 | 9.1 |
| | Friction modifier | Cashew dust | 6.8 | 6.8 | 6.5 | 6.5 | 6.5 | 6.5 |
| | | Titanate compound 1 | — | 18.7 | 17.9 | — | — | — |
| | | Titanate compound 2 | — | — | — | — | — | — |
| | | Titanate compound 3 | — | — | — | 17.9 | — | — |
| | | Titanate compound 4 | — | — | — | — | — | — |
| | | Titanate compound 5 | — | — | — | — | 17.9 | — |
| | | Titanate compound 6 | — | — | — | — | — | — |
| | | Titanate compound 7 | — | — | — | — | — | — |
| | | Titanate compound 8 | — | — | — | — | — | — |
| | | Titanate compound 9 | — | — | — | — | — | — |
| | | Titanate compound 10 | — | — | — | — | — | — |
| | | Titanate compound 11 | 18.7 | — | — | — | — | 17.9 |
| | | Barium sulfate 1 | 17.9 | — | — | — | — | 17.2 |
| | | Barium sulfate 2 | — | 17.9 | 17.2 | 17.2 | 17.2 | — |
| | | Artificial graphite | 1.9 | 1.9 | 1.8 | 1.8 | 1.8 | 1.8 |
| | | Mica | 15.4 | 15.4 | 14.8 | 14.8 | 14.8 | 14.8 |
| | | Iron oxide | 18.7 | 18.7 | 17.9 | 17.9 | 17.9 | 17.9 |
| | | Zirconium oxide | 4.3 | 4.3 | 4.1 | 4.1 | 4.1 | 4.1 |
| | | Antimony sulfide | 4.6 | 4.6 | 4.4 | 4.4 | 4.4 | 4.4 |
| | | Calcium hydroxide | 1.0 | 1.0 | 1.0 | 1.0 | 1.0 | 1.0 |
| | Fibrous base material | Fibrillated aramid fibers | 1.3 | 1.3 | 1.2 | 1.2 | 1.2 | 1.2 |
| | | Copper fibers | — | — | 3.9 | 3.9 | 3.9 | 3.9 |
| Content of Copper Component (% by mass) | | | 0.0 | 0.0 | 3.9 | 3.9 | 3.9 | 3.9 |
| Evaluations | | Forming Yield Rate (%) | 69 | 97 | 100 | 100 | 100 | 95 |
| | | Compressive Deformation Rate (%) | 10.1 | 2.5 | 1.4 | 1.0 | 1.1 | 4.9 |
| | | Porosity (%) | 16 | 23 | 19 | 19 | 17 | 15 |
| | | Rockwell Hardness (HRS) | 21 | 45 | 61 | 56 | 55 | 23 |
| | | Average Coefficient of Friction | 0.34 | 0.39 | 0.39 | 0.39 | 0.37 | 0.35 |
| | | Amount of Friction Material Wear (mm) | 1.11 | 0.84 | 0.79 | 0.80 | 0.56 | 1.09 |
| | | Amount of Rotor Wear (mg) | 1.4 | 1.2 | 1.1 | 1.2 | 1.2 | 1.5 |

Comparison of Examples 1 to 10 with Comparative Examples 1 to 2 shows that, in a composition free of copper component, a combination of titanate compound powder having a particular alkali metal ion dissolution rate with barium sulfate powder having a particular particle diameter provides a high forming yield rate and a small compressive deformation rate. Comparison of Examples 1 to 10 with Comparative Examples 3 to 5 shows that, also in a composition free of copper component, a combination of titanate compound powder having a particular alkali metal ion dissolution rate with barium sulfate particles having a particular particle diameter provides performance equal to or exceeding that of the composition containing copper in terms of frictional properties, forming yield rate, and compressive deformation rate.

Comparison between Comparative Example 1 and Comparative Example 6 shows that the composition free of copper component is significantly affected by the elution of alkali metal ions from titanate compound powder. Furthermore, it is also shown that the effects of the present invention cannot be obtained simply by combining titanate compound powder with barium sulfate powder.

The invention claimed is:

1. A friction material composition containing: titanate compound powder made of non-fibrous titanate compound particles; barium sulfate powder; and a thermosetting resin, wherein the titanate compound powder has an alkali metal ion dissolution rate of 15.0% by mass or less, the barium sulfate powder has a volume-based 50% cumulative particle diameter ($D_{50}$) of 0.1 μm to 20.0 μm, a content of copper component is 0.5% by mass or less in terms of copper element in a total amount of 100% by mass of the friction material composition, and the barium sulfate powder has a volume-based 90% cumulative particle diameter ($D_{90}$) of 0.1 μm to 20.0 μm.

2. The friction material composition according to claim 1, wherein the titanate compound powder has a volume-based 50% cumulative particle diameter ($D_{50}$) of 1.0 μm to 150.0 μm.

3. The friction material composition according to claim 1, wherein the titanate compound powder is powder of at least one compound selected from the group consisting of: $A_2Ti_nO_{(2n+1)}$ [where A represents at least one of alkali metals except for Li and n is a value from 4 to 11]; $A_{(2+y)}Ti_{(6-x)}M_xO_{(13+y/2-(4-z)x/2)}$ [where A represents at least one of alkali metals except for Li, M represents at least one selected from among Li, Mg, Zn, Ga, Ni, Cu, Fe, Al, and Mn, z represents a valence of the element M and is an integer from 1 to 3, 0.05≤x≤0.5, and 0≤y≤(4−z)x]; $A_xM_yTi_{(z-y)}O_4$ [where A represents at least one of alkali metals except for Li, M represents at least one selected from among Li, Mg, Zn, Ga, Ni, Cu, Fe, Al, and Mn, x is a value from 0.5 to 1.0, and y is a value from 0.25 to 1.0]; $A_{0.5-0.7}Li_{0.27}Ti_{1.73}O_{3.85-3.95}$ [where A represents at least one of alkali metals except for Li]; $A_{0.2-0.7}Mg_{0.40}Ti_{1.6}O_{3.7-3.95}$ [where A represents at least one of alkali metals except for Li]; and $A_{0.5-0.7}Li_{(0.27-x)}M_yTi_{(1.73-z)}O_{3.85-3.95}$ [where A represents at least one of alkali metals except for Li, M represents at least one selected from among Mg, Zn, Ga, Ni, Cu, Fe, Al, and Mn (as for M composed of two or more types of metals, excepting any combination of ions having different valences), as for M being a divalent metal, x=2y/3 and z=y/3, as for M being a trivalent metal, x=y/3 and z=2y/3, and 0.004≤y≤0.4].

4. The friction material composition according to claim 1, wherein the titanate compound powder has a sulfate ion dissolution rate of 0.2% by mass or less.

5. The friction material composition according to claim 1, wherein a content of the barium sulfate powder is 1% by mass to 50% by mass relative to a total amount of 100% by mass of the friction material composition.

6. The friction material composition according to claim 1, wherein a content of the titanate compound powder is 1% by mass to 40% by mass relative to a total amount of 100% by mass of the friction material composition.

7. A friction material being a formed body of the friction material composition according to claim 1.

8. A friction member comprising the friction material according to claim 7.

* * * * *